(12) United States Patent
Bowling

(10) Patent No.: US 10,458,879 B2
(45) Date of Patent: Oct. 29, 2019

(54) LEAK TESTING METHOD AND APPARATUS FOR USE WITH HEAT EXCHANGERS

(71) Applicant: EASYTESTERS LIMITED, Bridgewater, Somerset (GB)

(72) Inventor: Michael Keith Bowling, Bridgewater (GB)

(73) Assignee: Proactive Analytics Limited (GB)

( * ) Notice: Subject to any disclaimer, the term of this patent is extended or adjusted under 35 U.S.C. 154(b) by 267 days.

(21) Appl. No.: 15/731,126

(22) PCT Filed: Oct. 22, 2015

(86) PCT No.: PCT/GB2015/053172
§ 371 (c)(1),
(2) Date: Apr. 24, 2017

(87) PCT Pub. No.: WO2016/063071
PCT Pub. Date: Apr. 28, 2016

(65) Prior Publication Data
US 2017/0261398 A1    Sep. 14, 2017

(30) Foreign Application Priority Data

Oct. 24, 2014 (GB) .................................. 1418918.7
Nov. 24, 2014 (GB) .................................. 1420807.8

(51) Int. Cl.
*G01M 3/28* (2006.01)
*G01M 3/32* (2006.01)

(52) U.S. Cl.
CPC ........ *G01M 3/2815* (2013.01); *G01M 3/3227* (2013.01); *F28F 2200/00* (2013.01)

(58) Field of Classification Search
CPC ...... G01M 3/228; G01M 3/3227; G01M 3/22; G01M 3/188; G01M 3/3245; G01M 3/106; G01M 3/148; G01M 3/26; G01M 3/3254
See application file for complete search history.

(56) References Cited

U.S. PATENT DOCUMENTS 3,087,327 A * 4/1963 Kägi ........................ F28D 7/08
                                                      376/250
3,425,264 A * 2/1969 Frei Hans ............. F22B 37/421
                                                      165/70

(Continued)

FOREIGN PATENT DOCUMENTS

DE     102007041766 A1    3/2009
GB          1392690 A     4/1975
WO    WO -0142756 A1 *    6/2001

*Primary Examiner* — David A Rogers
(74) *Attorney, Agent, or Firm* — Ira S. Dorman

(57) ABSTRACT

The apparatus is used for testing heat exchangers having mutually separate first and second flow paths. The apparatus provides a high pressure fluid source (10) to connect with a first pressure-sealed flow path of the heat exchanger under test. A volumetric sensor (VS) is connected to a selected pressure-sealed flow path, having a sensing chamber arranged to receive fluid from the selected flow path. The sensing chamber is connected to a further fluid source such as a compressed air reservoir (16) which provides a high pressure gas supply. Movement of a magnetic float within the sensing chamber is detected by an array of Hall effect sensors, enabling a CPU to calculate the rate of leakage between the two flow paths which may be signaled to a local display and/or alarm or remotely via an internet connection.

20 Claims, 4 Drawing Sheets

(56) References Cited

U.S. PATENT DOCUMENTS

| | | | | |
|---|---|---|---|---|
| 4,686,851 A * | 8/1987 | Holm | G01M 3/3263 | 73/49.2 |
| 4,942,920 A * | 7/1990 | Chalifoux | F28F 9/0241 | 165/11.1 |
| 5,022,265 A * | 6/1991 | Voss | G01M 3/202 | 73/40.7 |
| 5,835,976 A * | 11/1998 | Kent | G01M 3/228 | 73/40.7 |
| 5,872,308 A * | 2/1999 | Bowling | G01M 3/188 | 73/40 |
| 6,009,745 A * | 1/2000 | Shaw | G01M 3/042 | 165/11.1 |
| 6,035,700 A * | 3/2000 | Shaw | G01M 3/106 | 73/40.7 |
| 6,044,692 A * | 4/2000 | Bowling | G01M 3/188 | 73/40 |
| 6,062,068 A * | 5/2000 | Bowling | G01M 3/188 | 73/40 |
| 6,314,794 B1 * | 11/2001 | Seigeot | G01M 3/228 | 73/40 |
| 6,923,043 B2 * | 8/2005 | Rabelle | G01M 3/3227 | 73/40 |
| 7,150,180 B2 * | 12/2006 | Werner | G01M 3/22 | 73/40.7 |
| 7,428,919 B2 * | 9/2008 | Young | G01K 17/06 | 165/11.1 |
| 7,454,956 B1 * | 11/2008 | LoPresti | G01M 3/3227 | 165/11.1 |
| 7,500,382 B2 * | 3/2009 | Werner | G01M 3/228 | 73/40.5 R |
| 8,261,593 B1 * | 9/2012 | Sanders | G01M 3/3245 | 73/40.5 R |
| 8,291,748 B2 * | 10/2012 | Kumar | G01M 3/3227 | 73/40.7 |
| 2003/0034146 A1 * | 2/2003 | Kaufman | G01M 3/3227 | 165/11.1 |
| 2003/0056572 A1 * | 3/2003 | Werner | G01M 3/22 | 73/40.7 |
| 2003/0079857 A1 * | 5/2003 | Mori | B01J 19/002 | 165/11.1 |
| 2004/0129061 A1 * | 7/2004 | Rabelle | G01M 3/3227 | 73/40 |
| 2005/0109083 A1 * | 5/2005 | Werner | G01M 3/22 | 73/40.7 |
| 2012/0111095 A1 | 5/2012 | Sheehan | | |
| 2013/0063588 A1 * | 3/2013 | Nemani | G01M 3/04 | 348/125 |
| 2017/0292798 A1 * | 10/2017 | Jancic | F28F 27/00 | |

* cited by examiner

US 10,458,879 B2

LEAK TESTING METHOD AND APPARATUS FOR USE WITH HEAT EXCHANGERS

TECHNICAL FIELD OF THE INVENTION

This invention relates to leak testing method and apparatus for use with heat exchangers, and more particularly heat exchangers having mutually separate fluid flow paths.

BACKGROUND

Heat exchangers with separate fluid flow paths are often used to transfer heat from one medium to another without intermixing of the two fluids. In many applications it is vital to avoid any intermixing—to prevent food products becoming contaminated with coolant in heat exchangers used in food processing plant or dairy pasteurisers for example.

For one reason or another, heat exchangers can sometimes have small leaks which may go undetected, perhaps due to minute manufacturing detects or corrosion. It is therefore necessary to provide a simple and reliable way of detecting leaks, whether it be a newly manufactured heat exchanger or one which is being returned to service after a period of use or following a maintenance procedure for example.

SUMMARY OF THE INVENTION

The present invention provides method of testing for leaks in a heat exchanger having separate first and second flow paths in mutual heat exchange relationship, both of said flow paths having two open ends.

The invention also provides leak testing apparatus for use with such a heat exchanger.

The invention may involve:
closing said open ends of the first flow path to pressure-seal the first flow path;
connecting a high pressure fluid source with the first flow path to increase the pressure therein;
maintaining a low pressure in the second flow path relative to the first flow path;
connecting a volumetric sensor to one of the first and second flow paths constituting a monitored flow path, said volumetric sensor having a sensing chamber arranged to receive fluid from the monitored flow path; and
monitoring the volumetric sensor for any change in fluid volume in the sensing chamber thereof caused by leakage of fluid from the first flow path.

The invention may include connecting a volumetric sensor to the first flow path and monitoring the volumetric sensor for any fall in fluid volume in the sensing chamber caused by leakage of fluid from the first flow path.

The invention may also include closing the open ends of the second flow path to pressure-seal the second flow path, connecting a volumetric sensor to the second flow path, and monitoring the volumetric sensor for any rise in fluid volume in the sensing chamber caused by leakage of fluid from the first flow path.

The invention may provide leak testing apparatus which includes a further fluid source to connect with the sensing chamber of a volumetric sensor.

The invention may provide leak testing apparatus which includes a further fluid source arranged to produce a fluid pressure which is substantially equal to the fluid pressure provided by a high pressure fluid source.

The invention may provide leak testing apparatus which includes a further fluid source which provides a pressurised gas.

The invention may provide leak testing apparatus which includes a high pressure fluid source which provides a pressurised liquid.

The invention also provides leak testing apparatus which includes a volumetric sensor having a signal element to move with changes in the volume of fluid within the sensing chamber, and the volumetric sensor includes detection means to monitor the position of the signal element.

The invention also provides leak testing apparatus which includes a volumetric sensor having detection means which comprises one or more of Hall effect sensors, ultrasonic sensors, capacitive sensors, visual sensors, contact sensors, or conductive sensors.

The invention also provides leak testing apparatus which includes processing means to calculate the leakage rate from a selected flow path.

The invention also provides leak testing apparatus which includes display means to visually present the leakage rate.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
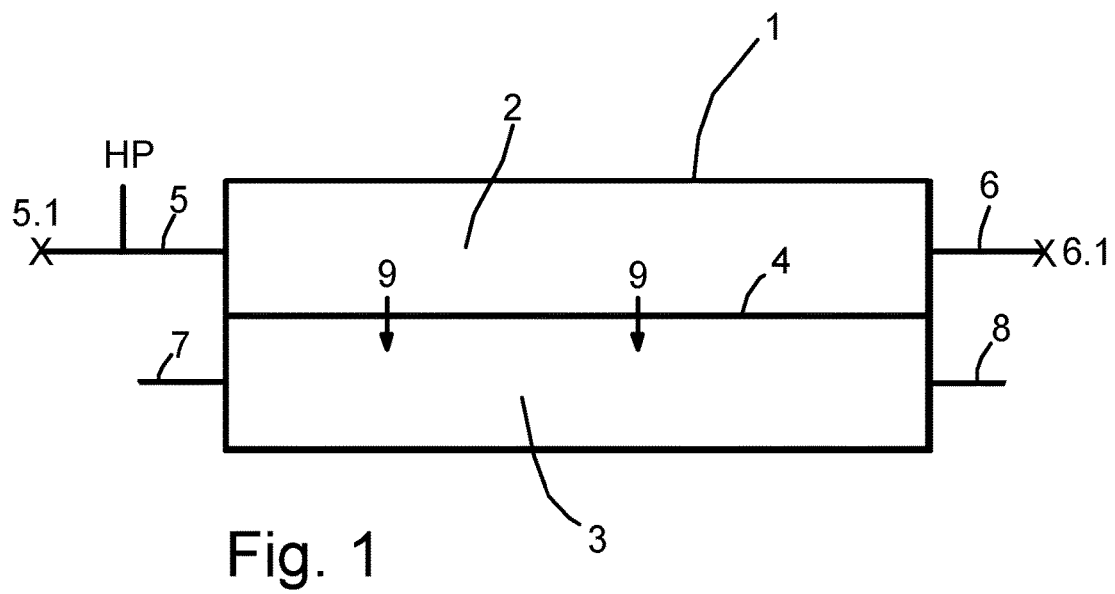
FIG. 1 is a schematic diagram of a typical heat exchanger.

Referring firstly to FIG. 1, a heat exchanger 1 contains first and second flow paths 2 and 3 which are mutually separated by an internal wall 4 designed for efficient transfer of heat between the two flow paths. Each of the flow paths, 2 and 3, is provided with separate open-ended fluid connections 5, 6 and 7, 8. By way of example, the heat exchanger may be of the plate or tubular kind. In a typical plate heat exchanger used in the food processing or dairy industries the wall 4 may comprise an array of thin metal plates which separate the two flow paths 2 and 3, one of which may carry a liquid coolant and the other of which carries a liquid food product such as milk. Heat exchangers may sometimes have small defects which result in leakage through the wall 4 at one or more positions 9 but which may be difficult to detect using conventional test methods.

When the heat exchanger is undergoing leakage testing two of the fluid connections 5, 6 or 7, 8 of either the product or service flow path are provided with shut-off valves. It should however be noted that it is not important which of the two heat exchanger flow paths is used. In this example the two shut-off valves, 5.1 and 6.1, are provided to enable the first flow path 2 to be closed off and form an internal pressure-sealed space, which thus constitutes a monitored flow path. A connection to the monitored flow path is provided via a connector HP.

Figure 2:
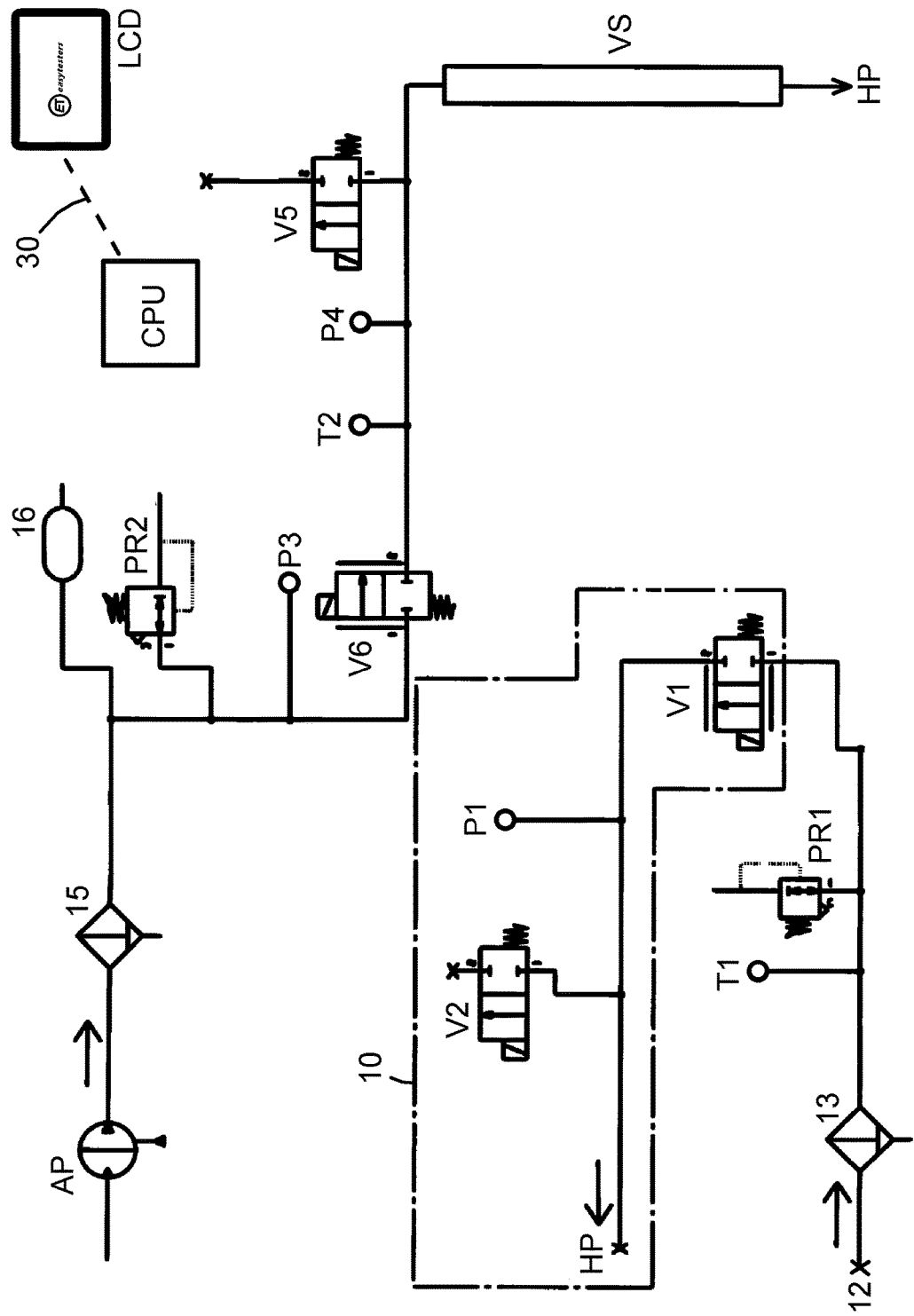
FIG. 2 is a schematic diagram of a first form of leak testing apparatus which is suitable for use with such a heat exchanger.

Referring to FIG. 2, leak testing apparatus for use with such a heat exchanger is controlled by a central processing unit CPU linked to a display screen LCD, e.g. a tablet computer, and/or alarms, either via a local connection or remotely via an internet or wireless connection. The testing apparatus provides a high pressure fluid source 10 ("high pressure" here meaning substantially above atmospheric pressure) to connect with the monitored flow path 2 of the heat exchanger under test. The fluid source 10 is fed from a water supply 12, which enters via an in-line water filter 13. An automatic pressure relief valve PR1, typically set at 6 bar, prevents an over-pressure condition, and the temperature of the filtered supply is monitored by the CPU via a first temperature sensor T1.

The high pressure fluid source 10 incorporates a flow control valve V1 which is operated by pulse width modulation (PWM) to control the supply of water from the 6 bar feed to a high pressure output HP. A high pressure sensor P1 enables the CPU to monitor the supply pressure, and a solenoid operated bleed valve V2 can be opened to reduce the supply pressure if required. The valves V1 and V2 therefore enable the CPU to provide close-tolerance pressure regulation to achieve a predetermined test pressure, e.g. 5 bar.

A volumetric sensor VS (described below in relation to FIG. 3) is connected to the high pressure fluid output HP. The testing apparatus also includes a further fluid source for supplying the volumetric sensor with gas pressure equal to that of the high pressure fluid supply HP. Atmospheric air is supplied via an air pump AP and an in-line air filter 15 to feed air at about 6 bar to a compressed air reservoir 16. An automatic pressure relief valve PR2, again typically set at 6 bar, ensures that over-pressure conditions are eliminated. The CPU also monitors the air supply pressure via pressure sensor P3. A PWM-operated control valve V6 controls the supply of air from the reservoir 16 ("PWM=pulse width modulation) following which a further temperature sensor T2 and pressure sensor P4 enable the CPU to monitor the air temperature and pressure supplied to the volumetric sensor VS. A solenoid operated air bleed valve V5 can be opened to reduce the air supply pressure so that, together, the valves V5 and V6 enable the CPU to provide close-tolerance pressure regulation of the air supply at a pressure equal to that of the high pressure output, i.e. 5 bar.

Figure 3:
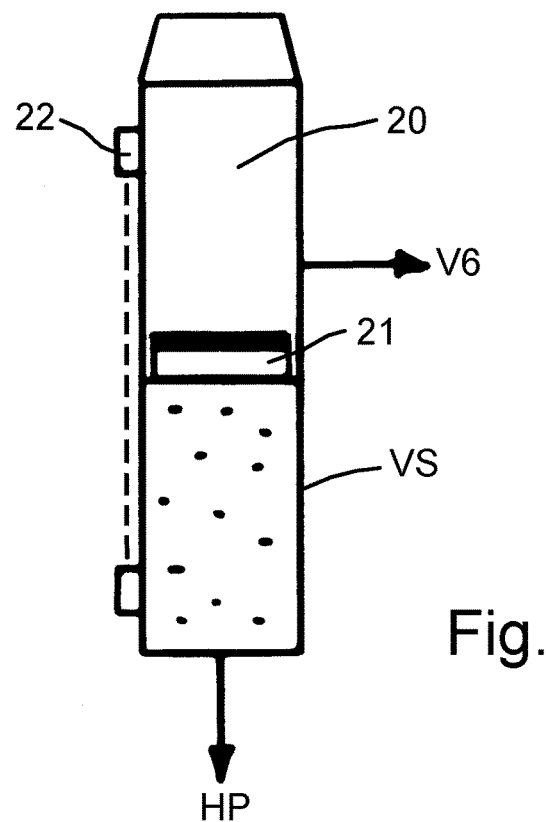
FIG. 3 is a schematic diagram of a volumetric sensor which is suitable for use in the leak testing apparatus.

Turning to FIG. 3, the volumetric sensor VS comprises a vertical tube providing a level sensing chamber 20 the lower end of which is connected to the high pressure fluid output HP. A magnetic float 21 is movable vertically within the chamber 20, carried up and down with the water level in the chamber. The wall of the chamber 20 is provided with an array of vertically-spaced Hall effect sensors 22, e.g. thirty six, the output signals from which are sent to the CPU to monitor the vertical position of the float 21.

The leak testing apparatus is typically used as follows:

1. The selected flow path of the heat exchanger is filled with water, flushed through until free from air, and the valves 5.1 and 6.1 are then closed.

2. The testing apparatus is powered up and air pump AP is run until the air pressure at sensor P3 reaches full pressure, e.g. 6 bar.

3. The water supply 12 is connected.

4. Flow control valve V1 is partially opened until any air has been bled from the high pressure supply.

5. The output HP from the high pressure water supply 10 and volumetric sensor VS, is connected to the heat exchanger. Valve V1 is opened until the pressure builds up to the predetermined test pressure, e.g. 5 bar, whereupon valve V1 is fully closed.

6. During a short stabilisation period the CPU regulates the test pressure, together with the air supply pressure to the volumetric sensor, using the PWM-controlled valves V1 and V6 and opening or closing the bleed valves V2 and V5 as necessary.

7. The CPU performs a leakage test by closing all the electrically-operated valves and records the float level in the volumetric sensor VS. After a predetermined elapsed time, e.g. 180 seconds, the level is read again.

8. If there is no leakage between the flow paths of the heat exchanger there will be no change in fluid level in the volumetric sensor, but if leakage takes place the fluid level in the sensor will fall. The CPU computes the leakage rate (which may be zero or a positive value) and displays the resulting leakage figure on the LCD display.

Figure 4:
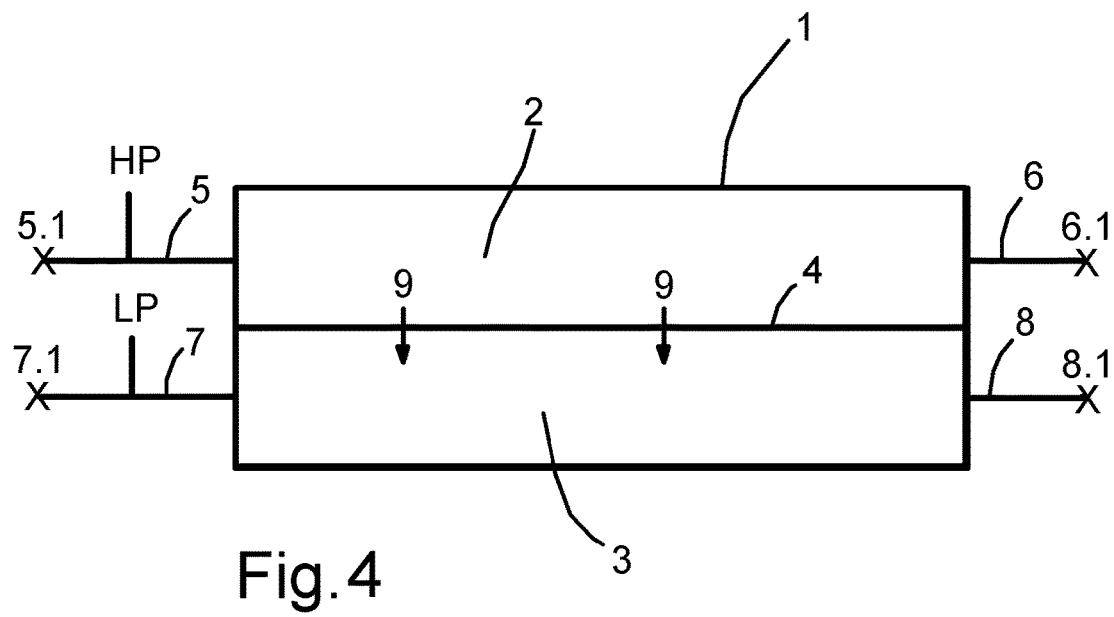
FIG. 4 is another schematic diagram of a typical heat exchanger.

A second embodiment of the leak testing apparatus will now be described in which the volumetric sensor is connected to the second fluid flow path of the heat exchanger. FIG. 4 again shows a heat exchanger 1 containing first and second flow paths 2 and 3 which are mutually separated by an internal wall 4 designed for efficient transfer of heat between the two flow paths. Each of the flow paths, 2 and 3, is provided with separate open-ended fluid connections 5, 6 and 7, 8. As described above, the wall 4 may comprise an array of thin metal plates which separate the two flow paths 2 and 3, one of which may carry a liquid coolant and the other of which carries a liquid food product such as milk. Small defects may result in leakage through the wall 4 at one or more positions 9 which may be difficult to detect using conventional test methods.

When the heat exchanger is undergoing testing using the second embodiment of the leak testing apparatus the fluid connections 5-8 are all provided with shut-off valves 5.1 to 8.1, which enable the two flow paths to be closed off, but a single connection to each of the flow paths can still be obtained via respective connectors HP and LP.

Figure 5:
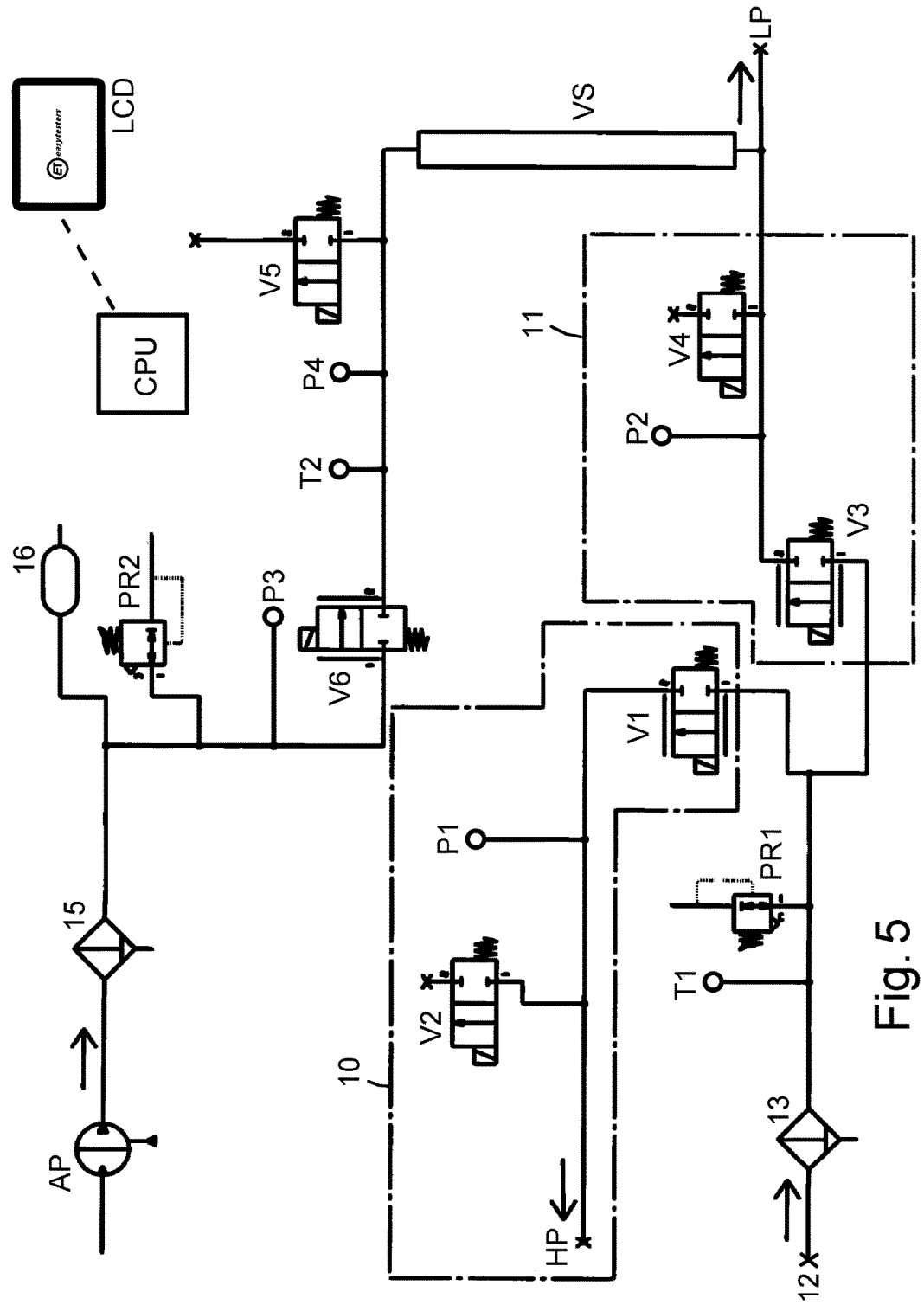
FIG. 5 is a schematic diagram of a second form of leak testing apparatus which is suitable for use with such a heat exchanger.

Referring to FIG. 5, the leak testing apparatus for use with such a heat exchanger is controlled by a central processing unit CPU linked to a display screen LCD, which may be provided by a remote tablet computer. The testing apparatus provides a high pressure fluid source 10 to connect with the first flow path 2 of the heat exchanger under test, and a low pressure fluid source 11 to connect with the second flow path 3 of the heat exchanger. It should however be noted that it is not important to which of the two heat exchanger flow paths the high and low pressure sources are connected. Both of the fluid sources 10 and 11 are fed from a common water supply 12, which enters via an in-line water filter 13. An automatic pressure relief valve PR1, typically set at 6 bar, prevents an over-pressure condition, and the temperature of the filtered supply is monitored by the CPU via a first temperature sensor T1.

The high pressure fluid source 10 incorporates a flow control valve V1 which is operated by pulse width modulation (PWM) to control the supply of water from the 6 bar feed to a high pressure output HP. A high pressure sensor P1 enables the CPU to monitor the supply pressure, and a solenoid operated bleed valve V2 can be opened to reduce the supply pressure if required. The valves V1 and V2 therefore enable the CPU to provide close-tolerance pressure regulation to achieve a predetermined high test pressure, e.g. 5 bar.

The low pressure fluid source 11 incorporates another PWM-operated flow control valve V3 which controls the supply of water from the 6 bar feed to low pressure output LP. A low pressure sensor P2 enables the CPU to monitor the pressure of the low pressure supply and a further solenoid operated bleed valve V4 can be opened to reduce the pressure at the low pressure output if required. By selective operation of the valves V3 and V4 the CPU can provide close-tolerance pressure regulation at the output LP to produce a predetermined lower fluid test pressure, e.g. 1 bar.

A volumetric sensor VS (described below in relation to FIG. 6) is connected to the low pressure fluid output LP. The testing apparatus also includes a third fluid source for supplying the volumetric sensor with gas pressure equal to that of the high pressure fluid supply HP. Atmospheric air is supplied via an air pump AP and an in-line air filter 15 to feed air at about 6 bar to a compressed air reservoir 16. An automatic pressure relief valve PR2, again typically set at 6 bar, ensures that over-pressure conditions are eliminated. The CPU also monitors the air supply pressure via pressure sensor P3. A PWM-operated control valve V6 controls the supply of air from the reservoir 16, following which a further temperature sensor T2 and pressure sensor P4 enable the CPU to monitor the air temperature and pressure supplied to the volumetric sensor VS. A solenoid operated air bleed valve V5 can be opened to reduce the air supply pressure so that, together, the valves V5 and V6 enable the CPU to provide close-tolerance pressure regulation of the air supply at a pressure equal to that of the high pressure output, i.e. 5 bar.

Figure 6:
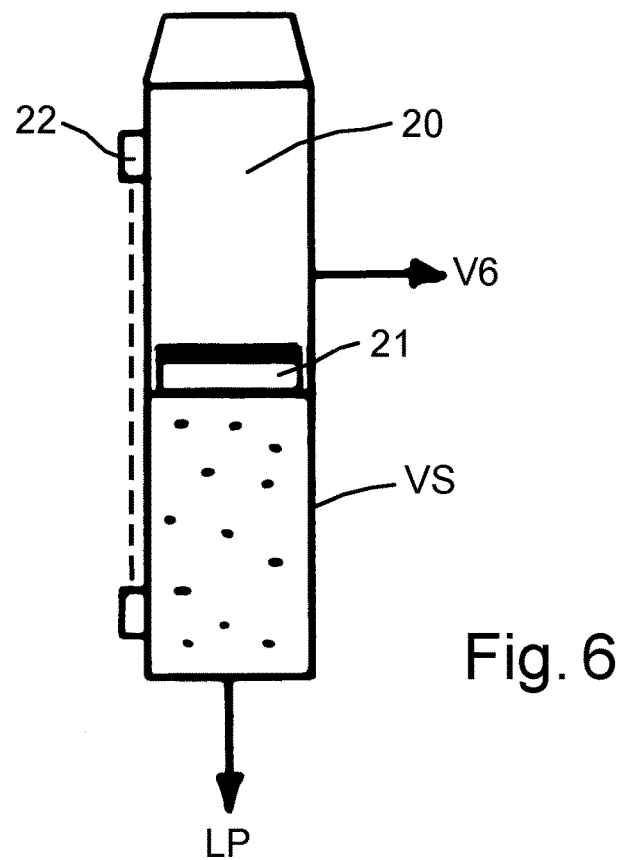
FIG. 6 is a schematic diagram of a volumetric sensor which is suitable for use with the leak testing apparatus of FIG. 5.

Turning to FIG. 6, the volumetric sensor VS comprises a vertical tube providing a level sensing chamber 20 the lower end of which is connected to the low pressure fluid output LP. A magnetic float 21 is carried vertically within the chamber 20, carried up and down with the water level within the chamber. The wall of the chamber 20 is provided with an array of vertically-spaced Hall effect sensors, e.g. thirty six, the output signals from which are sent to the CPU to monitor the vertical position of the float 21.

The leak testing apparatus is typically used as follows:

1. Both sides of the heat exchanger are filled with water, flushed through until free from air, and the connections 5-8 are then closed.

2. The testing apparatus is powered up and air pump AP is run until the air pressure at sensor P3 reaches full pressure, e.g. 6 bar.

3. The water supply 12 is connected.

4. Flow control valves V1 and V3 are partially opened until any air has been bled from the high and low pressure supplies.

5. The high pressure outputs HP is connected to the heat exchanger and valve V1 is opened until the pressure builds up to the higher test pressure, e.g. 5 bar, whereupon valve V1 is fully closed.

6. The low pressure output LP is connected to the heat exchanger and valve V3 is opened until the pressure builds up to the lower test pressure, e.g. 1 bar, whereupon valve V3 is fully closed.

7. During a short stabilisation period the CPU regulates the high and low test pressures, together with the air supply pressure to the volumetric sensor, using the PWM-controlled valves V1, V3 and V6 and opening/closing the bleed valves V2, V4 and V5 as necessary. The high and low pressure fluid supplies thus create a known pressure differential between the two flow paths within the heat exchanger.

8. The CPU performs a leakage test by closing all the electrically-operated valves and records the float level in the volumetric sensor VS. After a predetermined elapsed time, e.g. 180 seconds, the level is read again.

9. If there is no leakage between the flow paths of the heat exchanger there will be no change in fluid level in the volumetric sensor, but if leakage takes place the fluid level in the sensor will rise. The CPU computes the leakage rate (which may be zero or a positive value) and displays the resulting leakage figure on the LCD display.

It should be noted that the use of Hall effect sensors is preferred since they provide an accurate, reliable and inexpensive way of sensing the position of the float 21. Nevertheless, other kinds of signal element which move in accordance with changes in the volume of fluid within the sensing chamber could be used in combination with other kinds of position detection sensor. Examples of alternative sensors include, ultrasonic sensors, capacitive sensors, visual sensors, contact sensors, or conductive sensors.

The forms of leak testing apparatus described herein provide an accurate and reliable way of testing a heat exchanger for leakage using low cost equipment. The apparatus may be provided in a portable form or permanently installed on site.

Whilst the above description places emphasis on the areas which are believed to be new and addresses specific problems which have been identified, it is intended that the features disclosed herein may be used in any combination which is capable of providing a new and useful advance in the art.

The invention claimed is:

1. A method of testing for leaks in a heat exchanger having separate first and second flow paths in mutual heat exchange relationship, both of said flow paths having two open ends, which method includes:
   closing said open ends of the first flow path to pressure-seal the first flow path;
   connecting a high pressure fluid source with the first flow path to increase the pressure therein;
   maintaining a low pressure in the second flow path relative to the first flow path;
   connecting a volumetric sensor to one of the first and second flow paths constituting a monitored flow path, said volumetric sensor having a sensing chamber arranged to receive fluid from the monitored flow path;
   connecting a further fluid source to the sensing chamber of the volumetric sensor; and
   monitoring the volumetric sensor for any change in fluid volume in the sensing chamber thereof caused by leakage of fluid from the first flow path.

2. A method, of testing for leaks according to claim 1 in which the further fluid source produces a fluid pressure which is substantially equal to the fluid pressure provided by the high pressure fluid source.

3. A method of testing for leaks according to claim 1 in which the further fluid source provides a pressurised gas.

4. A method of testing for leaks according to claim 1 in which the high pressure fluid source provides a pressurised liquid.

5. A method of testing for leaks according to claim 1 in which the sensing chamber of the volumetric sensor contains a signal element which moves with changes in the volume of fluid from the monitored flow path within the sensing chamber, and the volumetric sensor includes detection means which is used to monitor the position of the signal element.

6. A method of testing for leaks according to claim 5 in which the detection means comprises one or more of Hall effect sensors, ultrasonic sensors, capacitive sensors, visual sensors, contact sensors, or conductive sensors.

7. A method of testing for leaks according to claim 1, which includes using processing means to calculate the leakage rate from the monitored flow path from information provided by the volumetric sensor.

8. A method of testing for leaks according to claim 7 which includes using display means to visually present the leakage rate.

9. A method of testing for leaks according to claim 1 which includes connecting the volumetric sensor to the first flow path and monitoring the volumetric sensor for any fall in fluid volume in the sensing chamber caused by leakage of fluid from the first flow path.

10. A method of testing for leaks according to claim 1 which includes closing said open ends of the second flow path to pressure-seal the second flow path, connecting the volumetric sensor to the second flow path, and monitoring the volumetric sensor for any rise in fluid volume in the sensing chamber caused by leakage of fluid from the first flow path.

11. Leak testing apparatus for use with a heat exchanger having separate first and second flow paths in mutual heat exchange relationship, both of said flow paths having two open ends, said leak testing apparatus including:
 means for closing said open ends of the first flow path to pressure-seal the first flow path;
 a high pressure fluid source for connection with the first flow path to increase the pressure therein whilst maintaining a low pressure in the second flow path relative to the first flow path;
 a volumetric sensor for connection to one of the first and second flow paths constituting a monitored flow path, said volumetric sensor having a sensing chamber to receive fluid from the monitored flow path;
 a further fluid source to connect with the sensing chamber of the volumetric sensor; and
 means for monitoring the volumetric sensor for any change in fluid volume in the sensing chamber thereof caused by leakage of fluid from the first flow path.

12. Leak testing apparatus according to claim 11 in which the further fluid source is arranged to produce a fluid pressure which is substantially equal to the fluid pressure provided by the high pressure fluid source.

13. Leak testing apparatus according to claim 11 in which the further fluid source provides a pressurised gas.

14. Leak testing apparatus according to claim 11 in which the high pressure fluid source provides a pressurised liquid.

15. Leak testing apparatus according, to claim 11 in which the sensing chamber of the volumetric sensor contains a signal element to move with changes in the volume of fluid from the monitored flow path within the sensing chamber, and the volumetric sensor includes detection means to monitor the position of the signal element.

16. Leak testing apparatus according, to claim 15 in which the detection means comprises one or more of Hall effect sensors, ultrasonic sensors, capacitive sensors, visual sensors, contact sensors, or conductive sensors.

17. Leak testing apparatus according to claim 11, including processing means to calculate the leakage rate from the monitored flow path from information provided by the volumetric sensor.

18. Leak testing apparatus according to claim 17 including display means to visually present the leakage rate.

19. Leak testing apparatus according to claim 11 in which the volumetric sensor is connected to the first flow path to detect any fall in fluid volume in the sensing chamber caused by leakage of fluid from the first flow path.

20. Leak testing apparatus according to claim 11 in which includes means for closing said open ends of the second flow path to pressure-seal the second flow path, and the volumetric sensor is connected to the second flow path to detect any rise in fluid volume in the sensing chamber caused by leakage of fluid from the first flow path.

* * * * *